(12) United States Patent
Thomas et al.

(10) Patent No.: US 8,595,484 B2
(45) Date of Patent: Nov. 26, 2013

(54) METHOD AND DEVICE FOR DISTRIBUTING PUBLIC KEY INFRASTRUCTURE (PKI) CERTIFICATE PATH DATA

(75) Inventors: Shanthi E. Thomas, Carpentersville, IL (US); Erwin Himawan, Chicago, IL (US); Ananth Ignaci, Lake-in-the-Hills, IL (US); Anthony R. Metke, Naperville, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 932 days.

(21) Appl. No.: 12/181,694

(22) Filed: Jul. 29, 2008

(65) Prior Publication Data

US 2010/0031027 A1 Feb. 4, 2010

(51) Int. Cl.
*H04L 9/00* (2006.01)

(52) U.S. Cl.
USPC ........................................... 713/156; 713/157

(58) Field of Classification Search
USPC ......... 713/150, 153, 155, 156, 168, 171, 175;
380/255, 258, 264, 270, 277, 278, 33;
726/2–4; 709/229
See application file for complete search history.

(56) References Cited

U.S. PATENT DOCUMENTS

| | | | |
|---|---|---|---|
| 6,134,550 A * | 10/2000 | Van Oorschot et al. | 1/1 |
| 6,314,517 B1 * | 11/2001 | Moses et al. | 713/156 |
| 7,356,329 B2 | 4/2008 | Willey et al. | |
| 7,383,433 B2 | 6/2008 | Yeager et al. | |
| 7,539,869 B1 * | 5/2009 | Mullan et al. | 713/176 |
| 2002/0087859 A1 * | 7/2002 | Weeks et al. | 713/156 |
| 2002/0124172 A1 * | 9/2002 | Manahan | 713/176 |
| 2003/0014629 A1 | 1/2003 | Zuccherato | |
| 2003/0061481 A1 * | 3/2003 | Levine et al. | 713/163 |
| 2003/0140223 A1 * | 7/2003 | Desideri | 713/153 |
| 2003/0182549 A1 * | 9/2003 | Hallin et al. | 713/156 |
| 2004/0030888 A1 * | 2/2004 | Roh et al. | 713/156 |
| 2004/0098586 A1 * | 5/2004 | Rebo et al. | 713/169 |
| 2004/0111375 A1 * | 6/2004 | Johnson | 705/64 |
| 2004/0111609 A1 * | 6/2004 | Kaji et al. | 713/156 |
| 2004/0249901 A1 * | 12/2004 | Wallace et al. | 709/207 |

(Continued)

FOREIGN PATENT DOCUMENTS

KR 1020050078837 A 8/2005

OTHER PUBLICATIONS

He Huang and Shyhtsun Felix Wu—An Approach to Certificate Path Discovery in Mobile Ad Hoc Networks:—Proceedings of the 1st ACM Workshop Security of Ad Hoc and Sensor Networks—2003—pp. 41-49.

(Continued)

*Primary Examiner* — Kambiz Zand
*Assistant Examiner* — Shiuh-Huei Ku
(74) *Attorney, Agent, or Firm* — Steve A. May; Randi L. Karpinia

(57) ABSTRACT

A method and device for distributing public key infrastructure (PKI) certificate path data enables relying nodes to efficiently authenticate other nodes in an autonomous ad-hoc network. The method includes compiling, at a certificate path management unit (CPMU), the PKI certificate path data (step 405). One or more available certificate paths are then determined at the CPMU for at least one relying node (step 410). Next, the PKI certificate path data are distributed by transmitting a certificate path data message from the CPMU to the at least one relying node (step 415). The certificate path data message includes information identifying one or more trusted certification authorities associated with the one or more available certificate paths.

20 Claims, 4 Drawing Sheets

(56) References Cited

U.S. PATENT DOCUMENTS

| | | | |
|---|---|---|---|
| 2005/0081037 A1 | 4/2005 | Kumatgai et al. | |
| 2005/0138359 A1 | 6/2005 | Simon et al. | |
| 2005/0154918 A1 | 7/2005 | Engberg | |
| 2007/0100701 A1* | 5/2007 | Boccon-Gibod et al. | 705/21 |
| 2007/0255743 A1* | 11/2007 | Gaucas | 707/102 |
| 2008/0005660 A1* | 1/2008 | Austel et al. | 715/513 |
| 2008/0022374 A1* | 1/2008 | Brown et al. | 726/5 |
| 2008/0034204 A1* | 2/2008 | Lakshminarayanan | 713/158 |
| 2008/0175382 A1* | 7/2008 | Gearhart et al. | 380/255 |
| 2008/0307516 A1* | 12/2008 | Levy-Abegnoli et al. | 726/9 |

OTHER PUBLICATIONS

Almenarez, Carbonell, Forne, Hinarejos, Lacoste, Marin and Montenegro—"Design of an Enhanced PKI for Ubiquitous Networks"—IEEE Computer Society—Proceedings of the 16th International Workshop on Database and Experts Systems Application—2005—5 pages.

Denis Pinkas and R. Housley—"Delegated Path Validation and Delegated Path Discovery Protocol Requirements"—Network Working Group—RFC 3379—2002—15 pages.

International Search Report and Written Opinion for International Application No. PCT/US2009/048539 mailed on Jan. 19, 2010.

International Preliminary Report on Patentability and Written Opinion for International Application No. PCT/U52009/048539 dated Feb. 1, 2011.

M Halappanavar, et al., "Efficient Certificate Path Validation in Public-Key Infrastructure," Department of Computer Science, Virginia, Aug. 4-6, 2003.

* cited by examiner

METHOD AND DEVICE FOR DISTRIBUTING PUBLIC KEY INFRASTRUCTURE (PKI) CERTIFICATE PATH DATA

FIELD OF THE DISCLOSURE

The present invention relates generally to wireless communication networks, and in particular to dynamic deployment of PKI certificate path data between network nodes.

BACKGROUND

Many wireless communication systems require a rapid deployment of independent mobile users as well as reliable communications between user nodes. Mesh networks are based on self-configuring autonomous collections of portable devices that communicate with each other over wireless links having limited bandwidths. A mesh network is a collection of wireless nodes or devices organized in a decentralized manner to provide range extension by allowing nodes to be reached across multiple hops. In a mesh network, communication packets sent by a source node thus can be relayed through one or more intermediary nodes before reaching a destination node. Mesh networks may be deployed as temporary packet radio networks that do not involve significant, if any, supporting infrastructure. Rather than employing fixed base stations, in some mesh networks each user node can operate as a router for other user nodes, thus enabling expanded network coverage that can be set up quickly, at low cost, and which is highly fault tolerant. In some mesh networks, special wireless routers also may be used as intermediary infrastructure nodes. Large networks thus can be realized using intelligent access points (IAPs), also known as gateways or portals, which provide wireless nodes with access to a wired backhaul or wide area network (WAN).

Mesh networks can provide critical communication services in various environments involving, for example, emergency services supporting police and fire personnel, military applications, industrial facilities and construction sites. Mesh networks are also used to provide communication services in homes, in areas with little or no basic telecommunications or broadband infrastructure, and in areas with demand for high speed services (e.g., universities, corporate campuses, and dense urban areas).

Establishing secure communications between nodes in a mesh communication network can be difficult and complex. Unlike nodes in a mesh communication network, nodes in wired networks and conventional mobile devices such as cellular phones often obtain communication security using infrastructure-based authentication processes. According to conventional public key infrastructure (PKI) methods, two infrastructure-based communication nodes performing a mutual authentication process may each have certificates signed by a different certification authority (CA). Similarly, the CAs of a local node and a remote node may be the same as or different than the CAs of the trust anchors of the local node and the remote node. In order to authenticate a remote node, a CA certificate trust path often must be established between a remote node's signing CA and at least one of a local node's trust anchor CAs. Therefore, conventional PKI methods for infrastructure-based communication nodes often provide a centralized authority, such as a public key directory, that can be queried for public key certificates.

However, nodes in mobile ad-hoc networks are sometimes not connected to infrastructure. Thus nodes in mobile ad-hoc networks may not be able to authenticate each other if the nodes have different signing CAs. Methods exist for pre-constructing PKI certificate paths at a centralized unit in order to minimize certificate path discovery time during certificate-based authentication. Such methods however rely on obtaining certificate path information from a centralized unit that is generally connected to infrastructure. Thus such methods are often impractical for use with nodes in autonomous, ad-hoc networks.

Accordingly, there is a need for an improved method and device for distributing public key infrastructure (PKI) certificate path data in autonomous ad-hoc networks.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
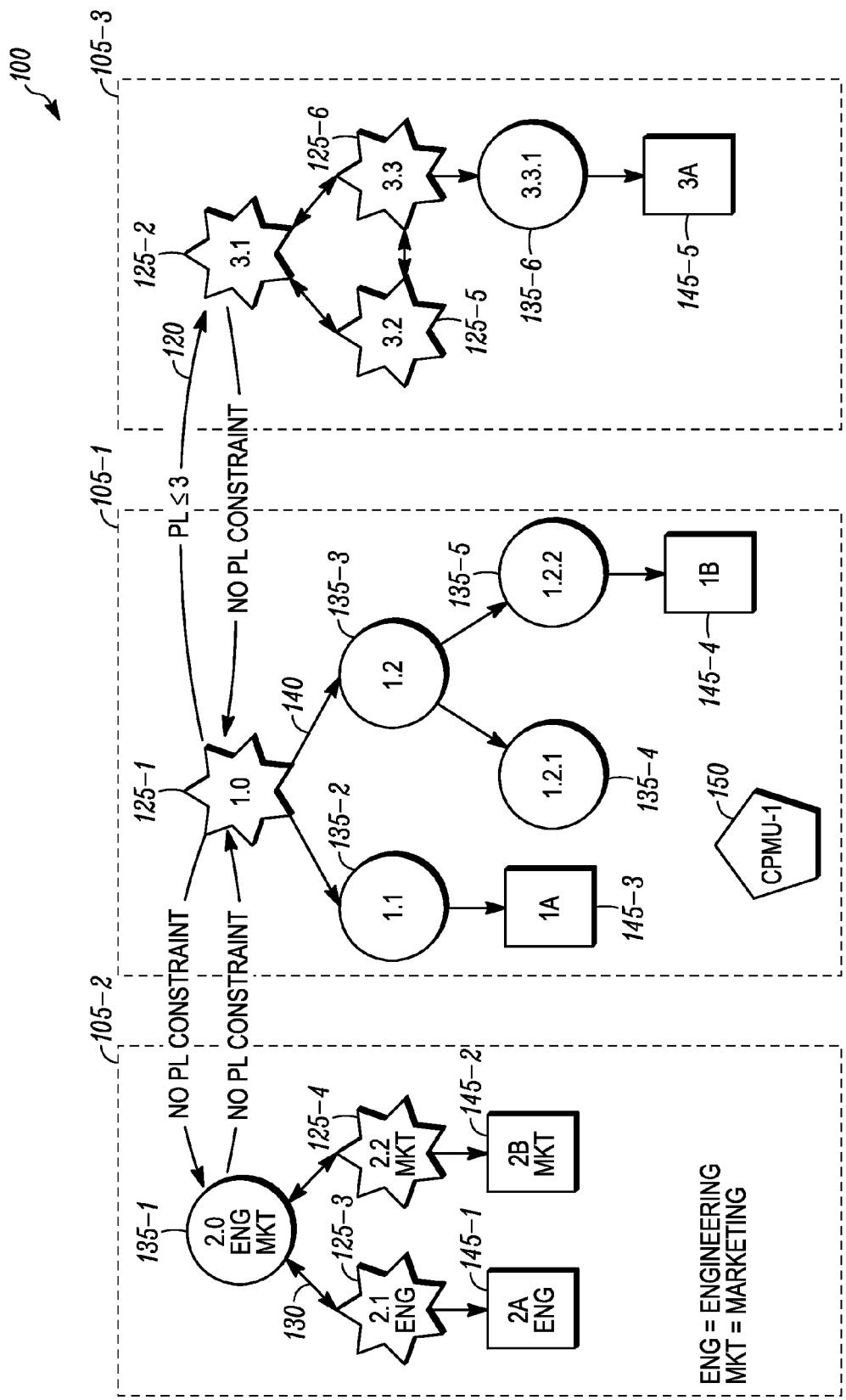
FIG. 1 is a network diagram illustrating components of an ad-hoc wireless communication network, according to some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

According to some embodiments of the present invention, a method for distributing public key infrastructure (PKI) certificate path data enables relying nodes to efficiently authenticate other nodes in an autonomous ad-hoc network. The method includes compiling, at a certificate path management unit (CPMU), the PKI certificate path data. One or more available certificate paths are then determined at the CPMU for at least one relying node. Next, the PKI certificate path data are distributed by transmitting a certificate path data message from the CPMU to the at least one relying node. The certificate path data message includes information identifying one or more trusted certificate authorities associated with the one or more available certificate paths.

Embodiments of the present invention thus can be used to efficiently distribute certificate path data that are collated at a central unit, such as a CPMU, to various user nodes in an autonomous ad-hoc network. The user nodes, also referred to herein as relying nodes, then can use the certificate path data to validate PKI certificates and thus authenticate other nodes in the network. Embodiments of the present invention can accelerate certificate validation processes because certificate path construction is not required during such processes. Also, validation processes may require only a single verification, where a validated public key of a CA that has signed a public key of a verified node is used to verify the node's certificate. Embodiments of the present invention may also enable a node to obtain a custom certificate path tree based on a set of policy constraints applied by the node.

PKI systems, built upon asymmetric cryptographic systems, can be used to enable mobile devices to authenticate one another. In an asymmetric cryptographic system, encryption and decryption of data are performed using different keys, where one key is kept secret and another key is safely divulged as needed. In a PKI system, there is at least one trusted entity, known as a certification authority (CA), which issues data structures (referred to as certificates) that bind specific identities to specific public keys and usage information via digital signatures. The CAs are trusted a priori based on their public keys that are known to be bound to their respective identities in advance. Entities other than CAs may establish trust among themselves by showing one another their respective certificates issued by trusted CAs. There may be a plurality of CAs in a given PKI domain, wherein the CAs may have a hierarchical or a meshed relationship among them. Trust relationships among CAs can be used to build a certification path, which is a chain of certificates where each certificate in the chain is validated by its preceding certificate's public key. A certificate path must terminate with a certificate that has a trusted public key, so that a verifier of the certificate path can verify, using the trusted public key (referred to as a trust anchor of the verifier), a certificate at the other end of the certificate path.

As described above, when a certificate is produced by an entity (referred to as a target) to demonstrate proof of possession of a valid public key, a verifier of the certification needs to construct a certificate path linking the verifier's trust anchor to the CA that has signed the certificate. In a multi-organizational environment, where each organization has its own PKI domain, applications supporting inter-organizational security require additional mechanisms to establish cross-organizational trust relationships, since certificate paths normally remain within respective PKI domains.

One method for addressing interoperability issues to support inter-organizational security involves use of cross-certificates, wherein CAs of different organizations cross sign one another's certificates to enable members in one organization to trust all user certificates issued by each cross-certified CA. To avoid scalability issues due to meshed CA cross-certification, a bridge CA may be used to cross sign certificates with each participating CA, such that members of each organization can trust all certificates issued by cross-certified CAs. However, both of the above methods are undesirable for establishing inter-organizational trust among disparate organizations that have specific and limited relationships. Such disparate organizations have to rely on predetermined policy constraints on certificate validation, where policy rules may include, for example, constraints on at least one of path length, domain name, and assurance level. Certificate validation therefore can be complicated by policy rules that may be required for large PKI domains.

Referring to FIG. 1, a network diagram illustrates components of an ad-hoc wireless communication network 100, according to some embodiments of the present invention. The ad-hoc wireless communication network 100, for example, can comprise a mesh enabled architecture (MEA) network or an 802.11 network(i.e. 802.11a, 802.11b, 802.11g, 802.11n or 802.11s). (For these and any IEEE standards recited herein, see: http://standards.ieee.org/getieee802/index.html or contact the IEEE at IEEE, 445 Hoes Lane, PO Box 1331, Piscataway, N.J. 08855-1331, USA.) It will be appreciated by those of ordinary skill in the art that the ad-hoc wireless communication network 100 can alternatively comprise any packetized communication network where packets are forwarded across multiple wireless hops. For example, the ad-hoc wireless communication network 100 can be a network utilizing multiple access schemes such as OFDMA (orthogonal frequency division multiple access), TDMA (time division multiple access), FDMA (Frequency Division Multiple Access), or CSMA (Carrier Sense Multiple Access).

The network 100 includes a first administrative domain 105-1, a second administrative domain 105-2, and a third administrative domain 105-3. As shown, some policy constraint rules apply to communications between the administrative domains 105-1, 105-2, 105-3. For example, as shown by arrow 120, communications between a trust anchor node 125-1 in the first administrative domain 105-1 and a trust anchor node 125-2 in the third administrative domain 105-3 must have a path length (PL) of no more than three hops. Further, a certification authority 135-1 in the second administrative domain 105-2 is restricted to certifying only marketing and engineering sectors of the network 100. Thus a trust anchor node 125-3 is restricted to only the engineering sector, which includes a relying node 145-1, and a trust anchor node 125-4 is restricted to only the marketing sector, which includes a relying node 145-2.

The first administrative domain 105-1 also includes four certification authorities 135-2, 135-3, 135-4, 135-5, and two relying nodes 145-3, 145-4. Further, the third administrative domain 105-3 includes two other trust anchor nodes 125-5, 125-6, a certification authority 135-6, and a relying node 145-5. A double-headed arrow between two nodes, such as the arrow 130, indicates that a valid cross-signed certificate exists between the two nodes. A single-headed arrow between two nodes, such as the arrow 140, indicates that a valid one-direction signed certificate exists between the two nodes.

Consider that a node device in the form of a certificate path management unit (CPMU) 150 operating in the first administrative domain 105-1 generates a certificate path tree for the relying node 145-3. As shown, the trust anchor of the relying node 145-3 is specified as the trust anchor node 125-1. Further consider that a policy constraint rule specified for the relying node 145-3 is "sector=Engineering". Thus the CPMU 150 will construct a certificate path tree for the relying node 145-3 that satisfies that policy constraint rule. Because they are in the marketing sector and not in the engineering sector, the trust anchor node 125-4 and the relying node 145-2 will not be included in the certificate path tree constructed for the relying node 145-3.

Tables 1, 2 and 3 below illustrate a certificate path generation for the relying node 145-3. For purposes of clarity, the certificate path generation is broken down into three passes, where pass one is illustrated in Table 1, pass two is illustrated in Table 2, and pass three is illustrated in Table 3. However, those having ordinary skill in the art will recognize that the certificate path generation could be accomplished in any number of passes including a single pass, two passes, more than three passes, etc. Also, the Tables 1, 2, and 3 include alternative reference numerals, as shown in FIG. 1, where all nodes in the first administrative domain 105-1 are designated 1x, all nodes in the second administrative domain 105-2 are designated 2x, and all nodes in the third administrative domain 105-3 are designated 3x.

In the first pass, the CPMU 150 generates a path tree extending from the trust anchor node 125-1 to a relevant target node. Table 1 includes the resulting path information, where the first column identifies a target node; the second column identifies a path from the target node to the trust anchor node 125-1; and the third column includes an aggregated path length from the trust anchor node 125-1 to the relevant target node, and policy constraints along the relevant path.

TABLE 1

| Target | Path | Computed Constraints Along Path |
|---|---|---|
| 1.1 | 1.0 | PL = 1, Sector = Any |
| 1.2 | 1.0 | PL = 1, Sector = Any |
| 1.2.1 | 1.2→1.0 | PL = 2, Sector = Any |
| 1.2.2 | 1.2→1.0 | PL = 2, Sector = Any |
| 3.1 | 1.0 | PL = 1, Sector = Any |
| 3.2 | 3.1→1.0 | PL = 2, Sector = Any |
| 3.2 | 3.3→3.1→1.0 | PL = 3, Sector = Any |
| 3.3 | 3.1→1.0 | PL = 2, Sector = Any |
| 3.3 | 3.2→3.1→1.0 | PL = 3, Sector = Any |
| 3.3.1 | 3.3→3.1→1.0 | PL = 3, Sector = Any |
| 3.3.1 | 3.3→3.2→3.1→1.0 | PL = 4, Sector = Any |
| 2.0 | 1.0 | PL = 1, Sector = Engineering, Marketing |
| 2.1 | 2.0→1.0 | PL = 2, Sector = Engineering |
| 2.2 | 2.0→1.0 | PL = 2, Sector = Marketing |

In the second pass, specific constraints of the trust anchor node 125-1 are applied from a relevant target node toward the trust anchor node 125-1. That includes the path length constraint of PL≤3 that was sent from the trust anchor node 125-1 to the trust anchor node 125-2. Thus any entries in Table 1 having a path length>3 are removed. The results are shown in Table 2 below.

TABLE 2

| Target | Path | Computed Constraints Along Path |
|---|---|---|
| 1.1 | 1.0 | PL = 1, Sector = Any |
| 1.2 | 1.0 | PL = 1, Sector = Any |
| 1.2.1 | 1.2→1.0 | PL = 2, Sector = Any |
| 1.2.2 | 1.2→1.0 | PL = 2, Sector = Any |
| 3.1 | 1.0 | PL = 1, Sector = Any |
| 3.2 | 3.1→1.0 | PL = 2, Sector = Any |
| 3.2 | 3.3→3.1→1.0 | PL = 3, Sector = Any |
| 3.3 | 3.1→1.0 | PL = 2, Sector = Any |
| 3.3 | 3.2→3.1→1.0 | PL = 3, Sector = Any |
| 3.3.1 | 3.3→3.1→1.0 | PL = 3, Sector = Any |
| ~~3.3.1~~ | ~~3.3→3.2→3.1→1.0~~ | ~~PL=4, Sector = Any~~ |
| 2.0 | 1.0 | PL = 1, Sector = Engineering, Marketing |
| 2.1 | 2.0→1.0 | PL = 2, Sector = Engineering |
| 2.2 | 2.0→1.0 | PL = 2, Sector = Marketing |

In the third pass, the CPMU 150 applies the node-specified policy constraint rule of "Sector=Engineering". A final certificate path tree composed for the relying node 145-3 is thus shown in Table 3 below.

TABLE 3

| Target | Path | Computed Constraints Along Path |
|---|---|---|
| 1.1 | 1.0 | PL = 1, Sector = Any |
| 1.2 | 1.0 | PL = 1, Sector = Any |
| 1.2.1 | 1.2->1.0 | PL = 2, Sector = Any |
| 1.2.2 | 1.2->1.0 | PL = 2, Sector = Any |
| 3.1 | 1.0 | PL = 1, Sector = Any |
| 3.2 | 3.1->1.0 | PL = 2, Sector = Any |
| 3.2 | 3.3->3.1->1.0 | PL = 3, Sector = Any |
| 3.3 | 3.1->1.0 | PL = 2, Sector = Any |
| 3.3 | 3.2->3.1->1.0 | PL = 3, Sector = Any |
| 3.3.1 | 3.3->3.1->1.0 | PL = 3, Sector = Any |
| ~~3.3.1~~ | ~~3.3→3.2→3.1→1.0~~ | ~~PL=4, Sector = Any~~ |
| 2.0 | 1.0 | PL = 1, Sector = Engineering, Marketing |
| 2.1 | 2.0 > 1.0 | PL = 2, Sector = Engineering |
| ~~2.2~~ | ~~2.0→1.0~~ | ~~PL=2, Sector = Marketing~~ |

After a certificate path tree, such as that shown in Table 3, and/or a trusted certification authority list, is transmitted to the RN 145-3 from the CPMU 150, then the RN 145-3 possesses the required information for authenticating any node in the ad-hoc wireless communication network 100, even a node from a different administrative domain such as the second administrative domain 105-2 or the third administrative domain 105-3.

According to some embodiments, because a validated public key of all certification authority nodes in a certificate path tree created for a specific relying node, such as the relying node 145-3 in the example above, are sent to the specific relying node, the certificate path tree information can be considered redundant. A specific relying node, such as the relying node 145-3, thus can validate a certificate of a verified node by using the validated public key of the certification authority (CA) that has signed the certificate. Therefore, according to some embodiments, certificate path tree information can be omitted from PKI certificate path data sent to a relying node from a CPMU, and only a trusted certification authority list is sent to the relying node in a certificate path data message.

Further, according to some embodiments, a CPMU, such as the CPMU 150, can cache PKI certificate path data that are sent to a relying node. Such cached PKI certificate path data thereafter do not need to be regenerated, but can be reused and sent to other relying nodes that have the same trust anchor as the relying node to which the data were originally sent.

Figure 2:
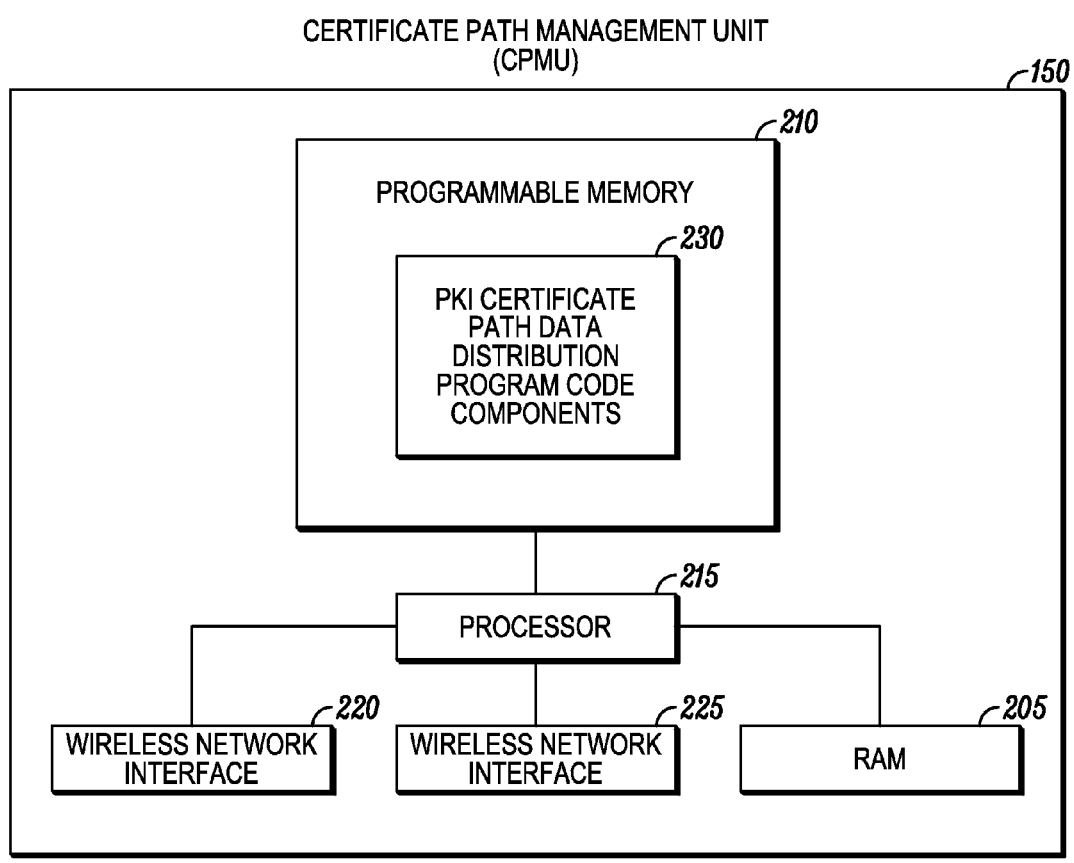
FIG. 2 is a block diagram illustrating components of a certificate path management unit (CPMU), according to some embodiments.

Referring to FIG. 2, a block diagram illustrates components of a certificate path management unit (CPMU), such as the CPMU 150, according to some embodiments. The CPMU 150, for example, can be an integrated unit containing at least all the elements depicted in FIG. 2, as well as any other elements necessary for the CPMU 150 to perform its particular functions. Alternatively, the CPMU 150 can comprise a collection of appropriately interconnected units or devices, wherein such units or devices perform functions that are equivalent to the functions performed by the elements of the CPMU 150.

The CPMU 150 comprises a random access memory (RAM) 205 and a programmable memory 210 that are coupled to a processor 215. The processor 215 also has ports for coupling to wireless network interfaces 220, 225. The wireless network interfaces 220, 225 can be used to enable the CPMU 150 to communicate with other node devices in an ad hoc wireless network or mesh network, such as the ad hoc wireless network 100. For example, the CPMU 150 can communicate with the relying node 145-3 using the wireless network interface 220 to receive and route data packets.

The programmable memory 210 can store operating code (OC) for the processor 215 and code for performing functions associated with a CPMU. For example, the programmable memory 210 can comprise PKI certificate path data, and computer readable program code components 230 configured to cause execution of a method for distributing PKI certificate path data as described herein.

Figure 3:
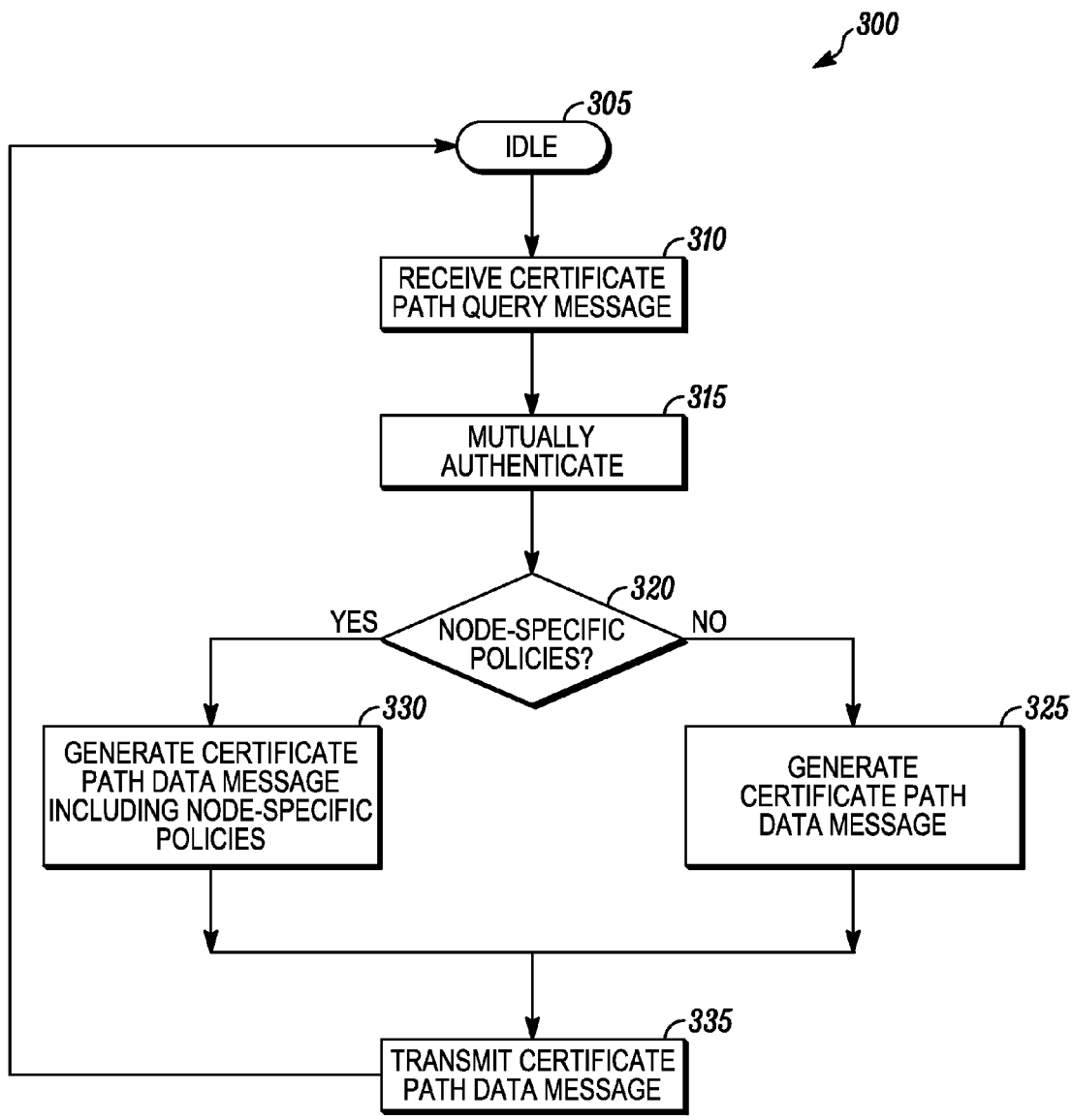
FIG. 3 is a general flow diagram illustrating a method for distributing PKI certificate path data, according to some embodiments.

Referring to FIG. 3, a general flow diagram illustrates a method 300 for distributing PKI certificate path data, according to some embodiments. For example, at block 305, consider that a CPMU, such as the CPMU 150 operating in the network 100, is in an idle state. Next, at block 310, the CPMU 150 receives a certificate path query message from a relying node, such as the relying node 145-3. Such a certificate path query message can identify the relying node 145-3, may identify trust anchors of the relying node 145-3, and may identify policies of the relying node 145-3.

At block 315, the CPMU 150 and the relying node 145-3 are mutually authenticated and establish a security association. For example, as known by those having ordinary skill in the art, such mutual authentication can occur in various ways including the use of secure sockets layer (SSL) algorithms.

At block 320, the CPMU 150 determines whether the certificate path query message specifies any node-specific policies of the relying node 145-3. When the certificate path query message does not specify any node-specific policies of the relying node 145-3, then at block 325 the CPMU 150 generates a certificate path data message. Such a certificate path data message includes a list of trusted certification authorities and a certificate path tree that is subject to CA constraints, as illustrated in Table 3 above.

However, when, at block 320 it is determined that the certificate path query message does specify node-specific policies of the relying node 145-3, then at block 330 the CPMU 150 generates a node-specific certificate path data message to the relying node 145-3. Such a node-specific certificate path data message includes a list of trusted certification authorities, a certificate path tree that is subject to CA constraints, and also the node-specific policies specified in the certificate path query message.

After the CPMU 150 generates the certificate path data message, at block 335 the CPMU 150 transmits the certificate path data message to the relying node 145-3. Finally, the method 300 loops back to block 305, where the CPMU 150 returns to an idle state.

According to alternative embodiments, a relying node and a CPMU can maintain a security association between them by using a "keep-alive" mechanism. For example, a CPMU can proactively transmit certificate path data updates relevant to a particular relying node for the entire duration of a security association between the CPMU and the relying node. According to such embodiments, a CPMU does not need to receive a certificate path query message from a relying node before transmitting a certificate path data message.

Figure 4:
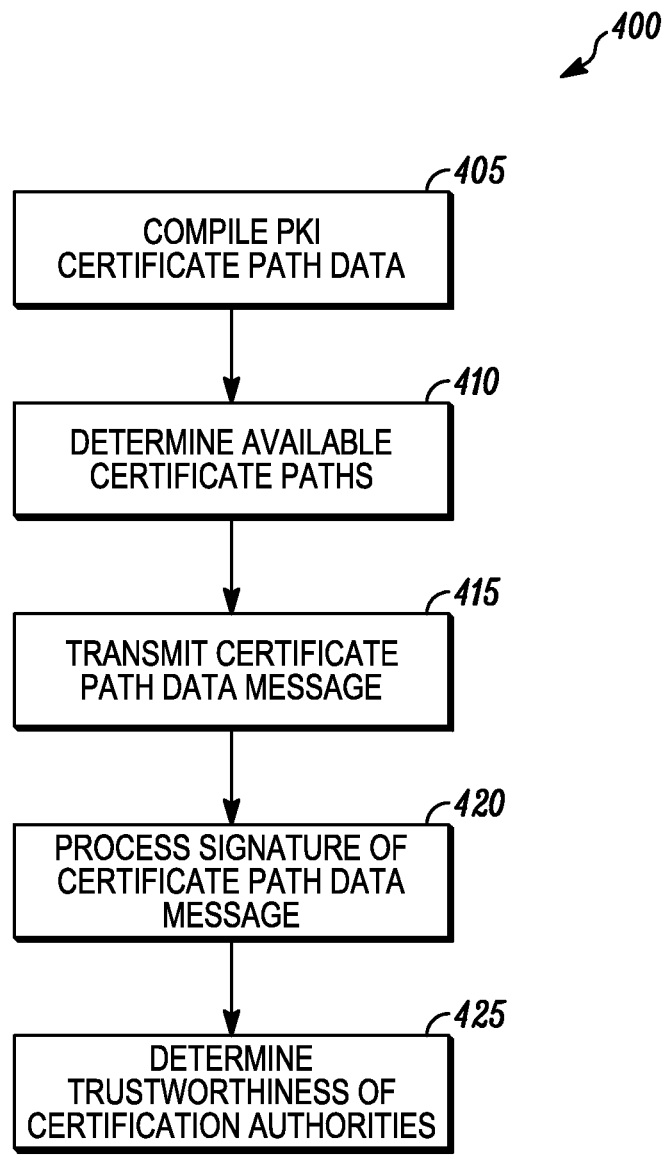
FIG. 4 is a further general flow diagram illustrating a method for distributing PKI certificate path data, according to some embodiments.

Referring to FIG. 4, a general flow diagram illustrates a method 400 for distributing PKI certificate path data, according to some embodiments. At step 405, a CPMU compiles the PKI certificate path data. For example, the CPMU 150 may compile certificate path data concerning the ad-hoc wireless communication network 100 by retrieving previous certificate path data stored in the programmable memory 210. Other examples of compiling certificate path data are known according to the prior art, such as the teachings of U.S. Pat. No. 6,134,550 titled "Method and Apparatus for Use in Determining Validity of a Certificate in a Communication System Employing Trusted Paths", to Van Oorschot et al., issued Oct. 17, 2000, and hereby incorporated by reference herein in its entirety.

At step 410, the CPMU determines one or more available certificate paths for at least one relying node. For example, the CPMU 150 may determine one or more available certificate paths for the relying node 145-3 in response to processing a certificate path query message received from the relying node 145-3. The one or more available certificate paths can be defined by a certificate path tree, such as that shown in Table 3. Further, the relying node 145-3 may transmit periodic certificate path query messages in order to receive updated PKI certificate path data that can update the certificate path tree.

Further, determining at the CPMU the one or more available certificate paths may comprise evaluating constraints imposed by certification authorities that are trusted by a trust anchor of the at least one relying node. For example, the CPMU 150 may evaluate constraints imposed by the certification authority 135-2 that is trusted by the trust anchor node 125-1 of the relying node 145-3. Also, determining at the CPMU the one or more available certificate paths may comprise evaluating constraints imposed by the at least one relying node.

At step 415, the PKI certificate path data are distributed by transmitting a certificate path data message from the CPMU to the at least one relying node, wherein the certificate path data message comprises information identifying one or more trusted certification authorities associated with the one or more available certificate paths. For example, the CPMU 150 may transmit to the relying node 145-3 a certificate path data message that identifies some of the certification authorities 135-1, 135-2, 135-3, 135-4, 135-5, 135-6 in the ad hoc wireless network 100.

The certificate path data message may include a signed object that includes a list that identifies the one or more trusted certification authorities and validated public keys for the one or more trusted certification authorities. For example, the list may include a validated public key for each trusted certification authority in the list. As described above, the certificate path data may also include other information such as policies, constraints, or certificate revocation lists (CRLs) for the one or more trusted certification authorities.

At step 420, the at least one relying node processes a signature of the certificate path data message received from the CPMU. For example, the relying node 145-3 processes a digital signature of the CPMU 150.

At step 425, the at least one relying node determines a trustworthiness of the one or more trusted certification authorities based on information contained in the certificate path data message. For example, in order to trust the certification authority 135-2 in the ad hoc wireless network 100, the relying node 145-3 can determine a trustworthiness of the certification authority 135-2 by using a validated public key of the certification authority 135-2 that was received in a signed certificate path data message received from the CPMU 150.

Advantages of some embodiments of the present invention therefore include enabling, in an ad hoc wireless network, an efficient distribution of PKI certificate path data to all trusted nodes. That enables relying nodes to authenticate other nodes and/or users in the network. Further, embodiments can accelerate certificate validation processes because construction of redundant certificate paths is reduced or eliminated. Also, validation processes between a CPMU and a relying node can be reduced to a single verification.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the present teachings. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, or contains a list of elements does not include only those elements but may include other elements not expressly listed or inherent to such process, method, article, or apparatus. An element preceded by "comprises a . . . ", "has a . . . ", "includes a . . . ", or "contains a . . . " does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and system described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for distributing certificate path data, the method comprising:
   operating a certificate path management unit(CPMU) to:
      obtain one or more node specified policy constraint rules for at least one relying node;
      compile a set of certificate path data comprised of a set of trusted certification authorities;
      apply the one or more node specified policy constraint rules to the set of certificate path data to generate a certificate path tree for a relying node of the at least one relying node, wherein the certificate path tree comprises paths from a trust node for the relying node of the at least one relying node to each of a plurality of hierarchically parallel target nodes; and
      transmit a certificate path data message to the relying node of the at least one relying node, wherein the certificate path data message includes the certificate path tree.

2. The method according to claim 1, wherein the certificate path data message includes a signed object that includes a list that identities the one or more trusted certification authorities and validated public keys for the one or more trusted certification authorities.

3. The method according to claim 1, wherein the certificate path data message includes policies, constraints, or certificate revocation lists (CRLs) for the one or more trusted certification authorities.

4. The method according to claim 1, further comprising:
   operating the at least one relying node to:
      process a signature of the certificate path data message; and
      determine a trustworthiness of the one or more trusted certification authorities based on information contained in the certificate path data message.

5. The method according to claim 2, wherein the list that identifies the one or more trusted certification authorities comprises a validated public key for each trusted certification authority in the list.

6. The method according to claim 1, wherein the certificate path tree comprises a list of certification authorities that are both trusted by a trust anchor of the at least one relying node and allowed by the one or more node specified policy constraint rules imposed by the at least one relying node.

7. The method according to claim 1, further comprising operating the certificate path management unit to:
   process a certificate path query message received from the at least one relying node prior to operating to compile the set of certificate path data.

8. The method according to claim 1, wherein the one or more node specified policy constraint rules associated with the at least one relying node include a corporate sector.

9. The method according to claim 7, further comprising:
mutually authenticating the CPMU and the at least one relying node after the CPMU receives the certificate path query message.

10. The method according to claim 7, wherein the certificate path query message is one of a plurality of periodic certificate path query messages used by the relying node to update the certificate path tree.

11. The method according to claim 7, wherein the certificate path query message identifies the at least one relying node.

12. The method according to claim 7, wherein the certificate path query message identifies one or more trust anchors of the at least one relying node.

13. The method according to claim 7, wherein the certificate path query message identifies the one or more node specified policy constraint rules of the at least one relying node.

14. A certificate path management unit (CPMU) for distributing certificate path data, the CPMU comprising:
a wireless network interface for obtaining one or more node specified policy constraint rules for at least one relying node; and
a programmable memory for storing:
computer readable program code components for compiling, at the CPMU, a set of certificate path data comprised of a set of trusted certification authorities;
computer readable program code components for applying the one or more node specified policy constraint rules to the set of certificate path data to venerate a certificate path tree for a relying node of the at least one relying node, wherein the certificate path tree comprises paths from a trust node for the relying node of the at least one relying node to each of a plurality of hierarchically parallel target nodes; and
the wireless network interface further for transmitting a certificate path data message to the relying node of the at least one relying node, wherein the certificate path data message includes the certificate path tree.

15. The certificate path management unit (CPMU) according to claim 14, wherein the certificate path data message includes a signed object that includes a list that identifies the one or more trusted certification authorities and validated public keys for the one or more trusted certification authorities.

16. The certificate path management unit ((CPMU) according to claim 14, wherein the certificate path data message includes policies, constraints, or certificate revocation lists (CRLs) for the one or more trusted certification authorities.

17. The certificate path management unit (CPMU) according to claim 14, wherein the one or more node specified policy constraint rules include a corporate sector.

18. The certificate path management unit (CPMU) according to claim 15, wherein the list that identifies the one or more trusted certification authorities comprises a validated public key for each trusted certification authority in the list.

19. A method for processing received certificate path data distributed by a certificate path management unit (CPMU) the method comprising:
operating a relying node to:
receive a certificate path data message from the CPMU, wherein the certificate path data message includes a certificate path tree generated by the CPMU by applying one or more node specified policy constraint rules to a set of certificate path data, wherein the certificate path tree comprises paths from a trust node for the relying node to each of a plurality of hierarchically parallel target nodes; and
determine a trustworthiness one or re trusted certificate authorities based on information in the certificate path data message.

20. A method according to claim 19, wherein the certificate path data message further includes a validated public key, and wherein the relying node uses the validated public key to determine the trustworthiness of the one or more trusted certificate authorities.

* * * * *